April 29, 1924. 1,492,203
N. M. CHUBRICH
TIRE INFLATING DEVICE
Filed March 22, 1922
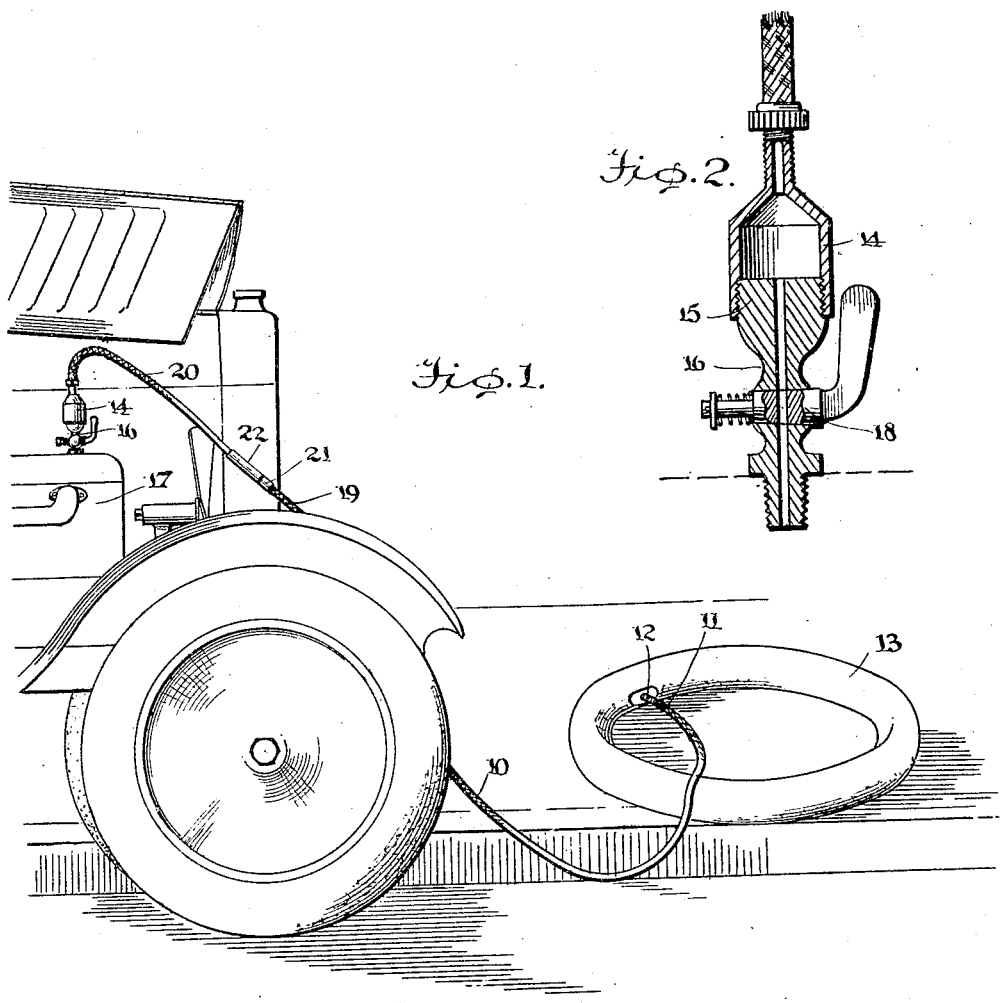
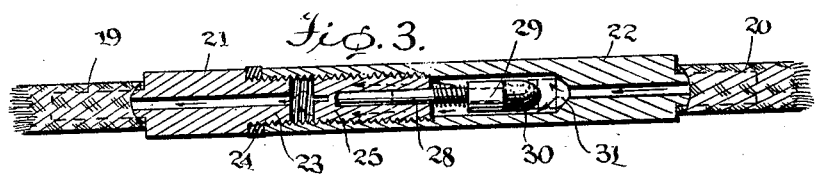
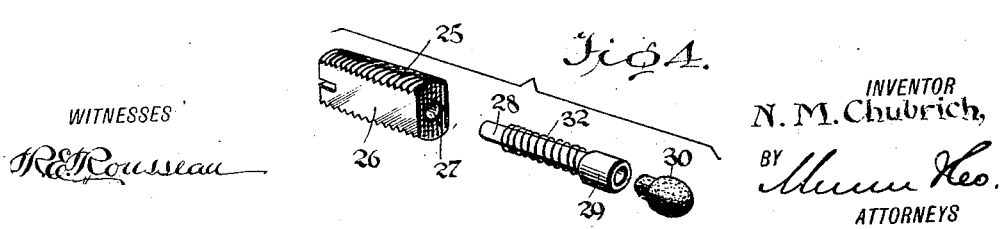
WITNESSES
R. E. Rousseau
INVENTOR
N. M. Chubrich,
BY
ATTORNEYS Patented Apr. 29, 1924.

1,492,203

UNITED STATES PATENT OFFICE.

NICK M. CHUBRICH, OF DETROIT, MICHIGAN.

TIRE-INFLATING DEVICE.

Application filed March 22, 1922. Serial No. 545,818.

*To all whom it may concern:*

Be it known that I, NICK M. CHUBRICH, a citizen of the United States, and a resident of Detroit, in the county of Wayne and State of Michigan, have invented certain new and useful Improvements in Tire-Inflating Devices, of which the following is a specification.

My present invention relates generally to tire inflating devices, and more particularly to a motor actuated pump, my object being the provision of simple and inexpensive means capable of being readily carried as a part of the equipment of an automobile or other motor car and of use in case of emergency to inflate tires and tubes on the road.

A further object is the provision of a simple inexpensive apparatus in which explosions of the motor may be taken advantage of to pump products of combustion for tire inflating purposes.

In the accompanying drawing which illustrates my present invention and forms a part of this specification, Figure 1 is a partial side view illustrating the practical application of my invention, Figure 2 is a detail sectional view through a cylinder pet cock and the means of attachment therewith as proposed by my invention, Figure 3 is a longitudinal section through the valved portion of the air line or tube, and Figure 4 is a detail perspective view of the valve and its guide removed.

Referring now to these figures my invention proposes the use of a flexible air line or tube 10 having at one end as at 11 in Figure 1 suitable means as for instance the connector or coupling ordinarily employed, for engagement with the valve stem 12 of an inflatable tube 13, and having at its opposite end an enlarged cylindrical attaching or coupling member 14 internally threaded adjacent to its outer end for engagement with the upper externally threaded portion 15 of a pet cock 16 use of which my invention proposes in connection with at least one of the cylinders of an automobile motor 17. This pet cock 16 may have the usual turning plug valve 18, turning movement of which to the open position permits of forcing products of combustion from the respective cylinder of the motor through the air line or tube 10 and into the tube 13 to be inflated.

In order to control this flow and prevent reverse movement of products through the air line or tube, the latter is preferably in two sections as for instance indicated at 19 and 20, joined intermediate the ends of the air line or tube by virtue of a plug member 21 and a socket member 22 the former of which has a reduced threaded portion 23 to enter the outer end of the threaded bore of the socket member and to provide for the reception of a gasket or packing ring 24 which will insure a snug tight and non-leaking joint.

It will be noted by reference to Figure 3 that the bore of the socket member 22 is of considerable length providing for the reception of a threaded valve guiding member 25 whose flattened sides 26 allow of the passage of products of combustion and prevents the passage of carbon in pieces of material size, and whose axial bore 27 is adapted to receive a valve stem 28, the latter projecting from a valve 29 whose detachable and renewable head 30 is preferably formed of some elastic or compressible material adapted to snugly seat against a valve seat 31 at the inner end of the bore of the socket member 22 in a direction toward the pet cock attaching member 14 so as to thus prevent flow through the air line toward the motor and yet permit the valve to readily yield to the passage of products in the opposite direction from the motor to the tire valve attaching member 11. The valve is controlled by a spring 32 coiled around the stem 28 between the valve and the adjacent or inner end of the valve guide member 25, the function of which spring is to normally hold the valve in the closed position against the valve seat 31.

It is thus obvious that the device proposed by my invention is especially useful in connection with automobiles and similar motor cars in view of the ease with which it may be carried by such vehicles as a part of the equipment thereof, and in view of the ease of attachment in operative position for use in any case of emergency on the road.

I claim:

A pump line for tire inflating devices, formed in two parts having cylinder and tire valve attaching members at their outer ends and having relatively engaging plug and socket members at their adjacent connecting ends threaded for detachable connection with one another, the said socket member having an elongated bore and a valve seat at the inner end of the bore, a valve movable axially of the socket member to and from said seat and having a stem, a valve bearing member threadedly adjustable in the socket member, having flattened sides and in which said stem is freely shiftable when said plug and socket members are connected, and a spring around the stem between the valve and the said bearing member to tension movement of the valve.

NICK. M. CHUBRICH.